United States Patent
Suomi et al.

(10) Patent No.: US 10,417,819 B2
(45) Date of Patent: Sep. 17, 2019

(54) COMPUTER AIDED MODELING

(71) Applicant: Tekla Corporation, Espoo (FI)

(72) Inventors: Jukka Suomi, Espoo (FI); Ville Rousu, Espoo (FI); Jarmo Manninen, Helsinki (FI); Petteri Villa, Helsinki (FI); Ragnar Wessman, Espoo (FI)

(73) Assignee: Tekla Corporation, Espoo (FI)

(*) Notice: Subject to any disclaimer, the term of this patent is extended or adjusted under 35 U.S.C. 154(b) by 1236 days.

(21) Appl. No.: 13/915,561

(22) Filed: Jun. 11, 2013

(65) Prior Publication Data

US 2013/0328872 A1 Dec. 12, 2013

Related U.S. Application Data

(60) Provisional application No. 61/660,357, filed on Jun. 15, 2012.

(51) Int. Cl.
*G06T 19/00* (2011.01)
*G06T 17/20* (2006.01)

(52) U.S. Cl.
CPC ............. *G06T 17/20* (2013.01); *G06T 19/00* (2013.01)

(58) Field of Classification Search
CPC ......... G06F 17/5004; G05D 2201/0202; A63F 2009/1248; G06T 17/20; G06T 19/00
See application file for complete search history.

(56) References Cited

U.S. PATENT DOCUMENTS

| | | | | |
|---|---|---|---|---|
| 5,299,307 | A * | 3/1994 | Young | G06F 3/04845 345/157 |
| 5,557,537 | A * | 9/1996 | Normann | G06F 17/509 434/72 |
| 6,219,049 | B1 * | 4/2001 | Zuffante | G06F 17/50 345/420 |
| 6,721,684 | B1 * | 4/2004 | Saebi | E04B 1/167 702/183 |
| 6,816,851 | B1 | 11/2004 | Olsson | |
| 7,765,240 | B2 * | 7/2010 | Alho | G06F 17/50 707/803 |
| 7,856,342 | B1 * | 12/2010 | Kfouri | G06F 17/50 703/1 |
| 8,762,877 | B2 * | 6/2014 | Loberg | 715/757 |
| 8,825,458 | B2 * | 9/2014 | Bumbalough | G06F 17/5004 700/98 |
| 9,599,466 | B2 * | 3/2017 | Pershing | G01B 21/28 |
| 9,626,461 | B2 * | 4/2017 | Moreau | G06F 17/5004 |

(Continued)

OTHER PUBLICATIONS

CAD/CAM Integrated Building Prefabrication Based on a Product Data Model by Shutao Li et al, Joint International Conference on Computing and Decision Making in Civil and Building Engineering, Jun. 14-16, 2006—Montréal, Canada, pp. 742-751.*

(Continued)

*Primary Examiner* — Aniss Chad
(74) *Attorney, Agent, or Firm* — Kilpatrick Townsend and Stockton

(57) ABSTRACT

To facilitate modeling a virtual object type is introduced. The virtual object type is a generic modeling aid by means of which one or more virtual objects, each representing a three-dimensional determined volume within a model, may be created, the virtual object being usable for modeling one or more physical objects representing one or more articles that will or may exist in the real world.

17 Claims, 5 Drawing Sheets

(56) References Cited

U.S. PATENT DOCUMENTS

| | | | | |
|---|---|---|---|---|
| 2002/0035408 A1* | 3/2002 | Smith | G06F 17/5004 | 700/97 |
| 2002/0107673 A1* | 8/2002 | Haller | G05B 19/41805 | 703/1 |
| 2002/0107674 A1* | 8/2002 | Bascle | G06F 3/011 | 703/1 |
| 2003/0009315 A1* | 1/2003 | Thomas | G06F 17/50 | 703/1 |
| 2004/0145614 A1* | 7/2004 | Takagaki | G06F 17/5004 | 345/420 |
| 2007/0091119 A1 | 4/2007 | Jezyk et al. | | |
| 2007/0174027 A1 | 7/2007 | Moiseyev | | |
| 2007/0179759 A1 | 8/2007 | Mangon | | |
| 2007/0291036 A1* | 12/2007 | McArdle | G06T 19/00 | 345/441 |
| 2008/0222568 A1* | 9/2008 | Okuwaki | G06F 17/50 | 715/825 |
| 2008/0238918 A1* | 10/2008 | Culver | G06F 17/5004 | 345/420 |
| 2010/0306681 A1* | 12/2010 | Loberg | G06F 17/5004 | 715/764 |
| 2012/0127302 A1* | 5/2012 | Imai | H04N 1/00323 | 348/135 |
| 2013/0132039 A1* | 5/2013 | Flammenspeck | G06F 17/5004 | 703/1 |
| 2013/0317786 A1* | 11/2013 | Kuhn | G06F 17/5004 | 703/1 |
| 2013/0328872 A1* | 12/2013 | Suomi | G06T 17/20 | 345/420 |
| 2014/0163710 A1* | 6/2014 | Moreau | G06F 17/5004 | 700/98 |
| 2014/0311077 A1* | 10/2014 | Firouz | E04B 5/40 | 52/474 |
| 2015/0193561 A1* | 7/2015 | Lindberg | G06F 17/5004 | 703/1 |
| 2016/0055268 A1* | 2/2016 | Bell | G06F 17/5004 | 703/1 |

OTHER PUBLICATIONS

Carrato et al., "*Proposed developments in computer modeling of cast-in-place concrete*". In: 19$^{th}$ International Conference on Structural Mechanics in Reactor Technology 2007 (SMiRT 19) vol. 1, pp. 1-7. Toronto, Aug. 2007, ISBN: 978-1-61567-050-5 [retrieved on Apr. 2, 2013]. Retrieved from the Internet: <URL:http://www.iasmirt.org/tranactions/19/B01_1.pdf>.

Sacks et al., "*Parametric 3D Modeling in Building Construction with Examples from Precast Concrete. Automation in Construction*", vol. 13, No. 3, May 2004, pp. 291-312, ISSN 0926-5805.

Search Report of National Board of Patents and Registration of Finland For Finnish Application No. 20125644 dated Apr. 12, 2013, 2 pages.

* cited by examiner

COMPUTER AIDED MODELING

RELATED APPLICATIONS

This application claims priority to FI patent application no. 20125644, filed Jun. 12, 2012, and to U.S. provisional patent application No. 61/660,357, filed Jun. 15, 2012, both of which are assigned to the applicant of the present application and are incorporated herein by reference in their entirety for all purposes.

FIELD

The invention relates to computer-aided modeling.

BACKGROUND

Modeling means that a model is created from an article/structure under design for describing the article/structure to be constructed, the model containing at least information needed to illustrate the article/structure. The development of data processing systems and computers has transformed modeling into a computerized process, where a product model is created from the article/structure. For example, the product model of a building is an entity consisting of the product data on the life span of the building and building process.

Computer applications typically apply predefined object types that are provided with values in connection with the modeling to create model objects of articles that exist or will exist in the real world. Examples of these object types in the field of building modeling include beams, columns, plates and reinforcement. The object types map to precast structures that are unambiguous and distinct units. However, mapping the object types to cast-in-place structures is not so simple; the cast-in-place structures cannot be divided into structural building elements since there are no exact definitions when a slab ends and a beam supporting the slab starts, for example.

SUMMARY

An object of the present invention is to provide a modeling tool facilitating modeling. The object of the invention is achieved by a method, an apparatus and a computer program product which are characterized by what is stated in the independent claims. The preferred embodiments of the invention are disclosed in the dependent claims.

An aspect of the invention provides a virtual object type which is a generic three-dimensional modeling aid by means of which one or more virtual objects, each representing a three-dimensional determined volume within a model, may be created, a virtual object being usable for modeling one or more physical objects representing one or more articles that will or may exist in the real world. Thus, the virtual object is an aid geometry for the one or more physical objects representing the one or more articles.

BRIEF DESCRIPTION OF THE DRAWINGS

In the following, embodiments will be described in greater detail with reference to the accompanying drawings, in which.

DETAILED DESCRIPTION OF SOME EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment.

The present invention is applicable to any computer-aided modeling system and corresponding modeling applications (i.e. modeling programs). The invention is particularly suitable for entity-based modeling systems in which the physical properties of an article to be modeled are expressed as attributes, i.e. by using parameters. In other words, an object is given its creation point or points, such as a starting point and an ending point of the object, the amount of creation points depending on the article to be modeled by the object, and values for different parameters representing the physical values of the article. This way the object is not tied to the physical properties of the article it depicts, but the geometry of the object can be created, when needed, by using the parameters. For example, a beam may be modeled in an entity-based modeling system by defining its starting point and ending point and providing values for different parameters representing physical properties of the beam. The parameters of a beam, for example, may include location, material, type of cross-section and size. The parameters may even indicate the type of the object, which in the beam example is a beam. The invention may also be implemented in outline-based modeling systems, in which an object consists of edges and the form and size of the article are essential elements of the object. In an outline-based modeling system a beam, for example, is modeled by drawing each side of the beam and then combining the sides to form the beam, the profile of the beam being then modified by moving a necessary number of beam sides away from their original location.

In the following, the invention will be described by using the principles of the entity-based modeling system, without restricting the invention thereto.

Figure 1:
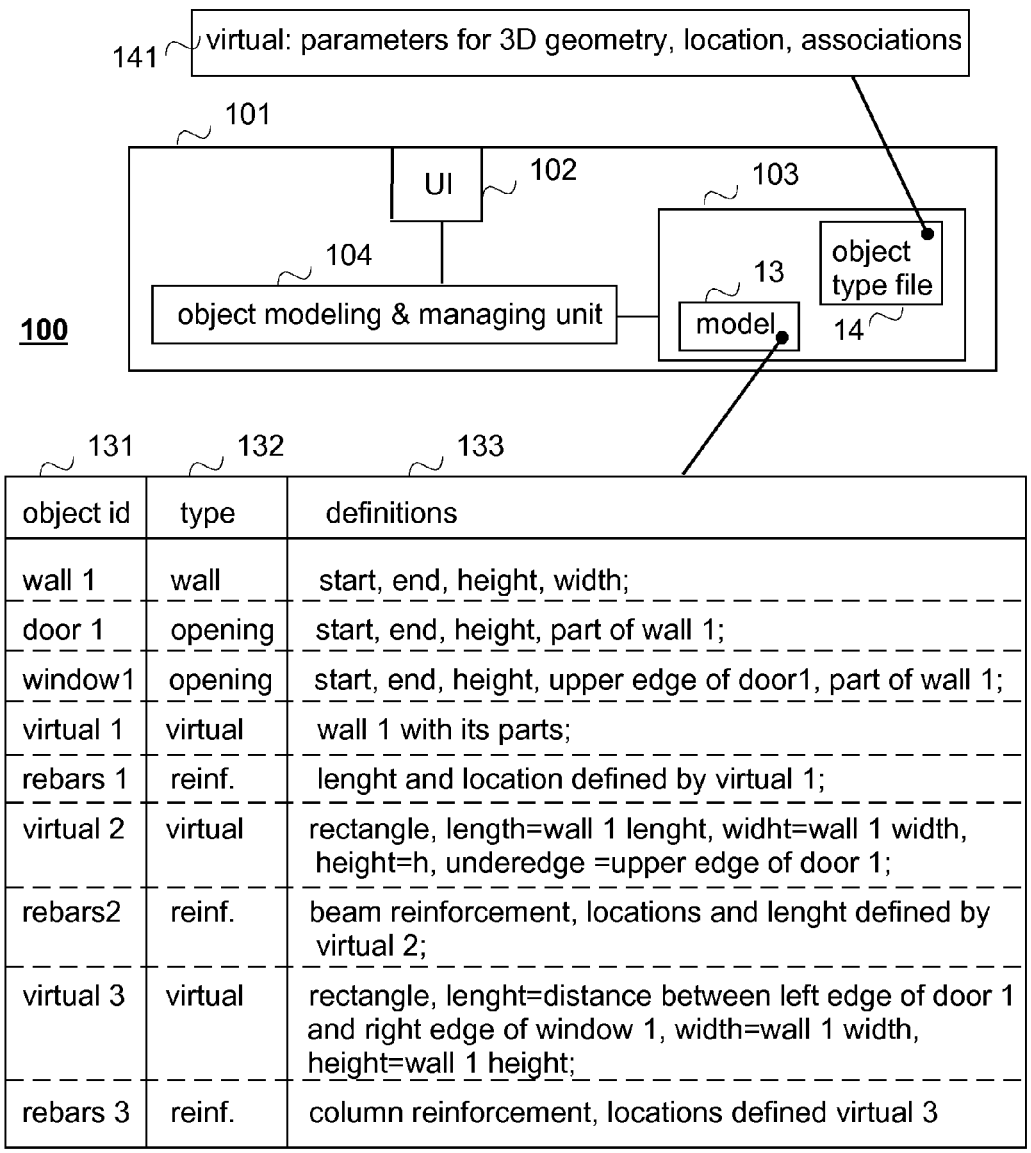
FIG. 1 shows a simplified architecture of an exemplary system having schematic block diagrams of exemplary apparatuses.

FIG. 1 illustrates a simplified modeling system 100 comprising one or more apparatuses 101 (only one shown in FIG. 1). It is obvious to a person skilled in the art that the system may also comprise other functions and structures that need not be described in greater detail here. Further, details of the disclosed structures and apparatuses that are not disclosed below, are irrelevant to the invention, and therefore they are not described in detail here.

The apparatus 101 is a computing device comprising not only prior art means but also means for implementing functionality described with an embodiment/example, and it may comprise separate means for each separate function or the means may be configured to perform two or more functions and even to combine functions of different embodiments/examples. These means may be implemented by various techniques. For example, the means may be implemented in hardware (one or more apparatuses), firmware (one or more apparatuses), or software (one or more modules) components (recorded indelibly on a medium such as read-only-memory or embodied in hard-wired computer circuitry), or combinations thereof. For a firmware or software, implementation can be through units/modules (e.g. procedures, functions, and so on) that perform the functions described herein. For this purpose, the apparatus 101 illustrated in FIG. 1 comprises a user interface 102, one or more data storages 103 (only one shown in FIG. 1) and an object modeling and managing unit 104. It should be appreciated that the implementation of the operative connections between the units may deviate from what is presented in FIG. 1. The computing apparatus 101 may be any apparatus with which the model may be created and/or edited and/or viewed. Examples of apparatuses include a work station, such as a laptop, a smartphone, a personal computer, a tablet computer, a field device, an e-reading device, a smart phone, or a personal digital assistant (PDA).

The user interface 102 is the interface of the user, i.e. the person processing the model, to the modeling system. The user can create a model, modify a model, study it, output desired drawings and reports of the model, view the drawings beforehand, input information to the model, etc. by means of the user interface 102.

The one or more data storages 103 comprise, for example, data relating to a model and stored/to be stored during modeling. In the illustrated example, the data storage 103 comprises a model file 13 that represents a wall to be constructed. In the illustrated example the wall is represent by different objects each having an object identifier (id) 131, a type 132 of the object and object definitions 133 of the object. The object identifiers, types and object definitions are pseudo identifiers, types and definitions illustrating the idea and not information actually used and stored. In the example, the data are stored in the data storage in the file and during processing the data constitute a "run-time database" in a central memory of the computing apparatus where they are read from a disk memory and where they can be processed faster. When the processing ends, the run-time data of the database, or at least the modified data, are stored in the disk memory. It is obvious to a person skilled in the art that data can be stored in one or more files and/or they can be stored/processed in another form and/or by using other memories. Further, instead of or in addition to the above described disk memory, an object-oriented database or a relation database, for example, can be utilized and used over a network from one or more terminals, for instance. Various programming techniques, storage of data in memory and manners of implementing databases and data storages develop constantly. This may require extra changes in the invention. Consequently, all terms and expressions should be interpreted broadly, and they are intended to describe, not to restrict, the invention.

In the illustrated example, the data storage 103 further comprises an object type file 14 of the modeling system. The object type file 14 contains, in addition to physical object types and their parameter definitions (not shown in FIG. 1), a virtual object type 141. Unlike a physical object type, defining certain limits to a specific geometry it models, the virtual object type is basically a generic object type, the geometry of which is freely definable by the user or concluded by the object modeling and managing unit. The parameters of the virtual object type 141 include definition of three dimensional geometry, location in the model, and associations. In an implementation a virtual object has no other characteristics or parameters than those defining the volume and the position. However, it should be appreciated that there may exist two or more virtual object types which may comprise some additional characteristics or parameters. For example, there may be a separate virtual object type for assisting modeling of columns, a separate virtual object type for assisting modeling of beams, etc. However, in any case, a virtual object does not represent an article that will or may exist in the real world or at least is planned to exist in the real world. The term "physical object" used herein means an object representing an article that will or may exist in the real world or at least is planned to exist in the real world. Further, it should be appreciated that the term "article" used herein means, in addition to one or more single pieces/articles, one or more parts, one or more assemblies including sub-assemblies, one or more structures, and one or more connections with their articles, like bolt(s), weld(s) or reinforcement splices(s).

The apparatus 101 comprises the object modeling and managing unit 104 for performing functionalities from different embodiments described below. The object modeling and managing unit 104 may be a separate unit or integrated to another unit in the apparatus. In another embodiment of the invention, the object modeling and managing unit 104 may be divided into separate units; for example, one unit for modeling by using a virtual object, one unit for conventional modeling and one unit for co-operation of the two other units.

An apparatus implementing a functionality or some functionality according to an embodiment may generally include a processor (not shown in FIG. 1), controller, control unit, micro-controller, or the like connected to a memory and to various interfaces of the apparatus. Generally the processor is a central processing unit, but the processor may be an additional operation processor. The object modeling and managing unit 104 may be configured as a computer or a processor, or a microprocessor, such as a single-chip computer element, or as a chipset, including at least a memory for providing storage area used for arithmetic operation and an operation processor for executing the arithmetic operation. The object modeling and managing unit 104 may comprise one or more computer processors, application-specific integrated circuits (ASIC), digital signal processors (DSP), digital signal processing devices (DSPD), programmable logic devices (PLD), field-programmable gate arrays (FPGA), and/or other hardware components that have been programmed in such a way to carry out one or more functions of one or more embodiments. An embodiment provides a computer program embodied on any client-readable distribution/data storage medium or memory unit(s) or article(s) of manufacture, comprising program instructions executable by one or more processors/computers, which instructions, when loaded into an apparatus, constitute the editing unit and/or the transaction manager unit. Programs, also called program products, including software routines, program snippets constituting "program libraries", applets and macros, can be stored in any medium and may be downloaded into an apparatus. The data storage medium or the memory unit may be implemented within the processor/computer, or external to the processor/computer, in which case it may be communicatively coupled to the processor/computer via various means as is known in the art. In other words, the object modeling and managing unit 104 may be an element that comprises one or more arithmetic logic units, a number of special registers and control circuits.

Further, the apparatus may comprise other units, and it comprises different interface units, such as an outputting unit (not illustrated in FIG. 1) for providing different outputs, like material lists or drawings. The apparatus may further comprise one or more receiving units and/or transmitting units (including a transmitter and/or a receiver or a corresponding means for receiving and/or transmitting information) so that user data, content, control information, signaling and/or messages can be received and/or transmitted.

The apparatus may generally include a volatile and/or non-volatile memory that may be configured to be the data storage. The memory may also store a computer program code, such as software applications (for example for the object modeling and managing unit 104) or operating systems, information, data, content, or the like for the processor to perform steps associated with the operation of the apparatus in accordance with the embodiments. The memory may be, for example, EEPROM, ROM, PROM, RAM, DRAM, SRAM, SSD, firmware, programmable logic, a hard drive, or other fixed data memory or storage device etc., and typically store content, data, or the like. Further, the memory, or part of it, may be a removable memory detachably connected to the apparatus.

It should be appreciated that the apparatus may comprise other units used in or for modeling. However, they are irrelevant to the actual invention and, therefore, they need not to be discussed in more detail here.

Although the apparatus has been depicted as one unity, different units and memory may be implemented in one or more physical or logical units. Different embodiments of such an apparatus, or more precisely, different examples of a functionality of the object modeling and managing unit 104 are described in more detail below.

The modeling system illustrated in FIG. 1 represents the simplest modeling system. In larger modeling systems, the apparatus may be a terminal and the data storage a database with which the terminal communicates via a server. In such a system, the server may be configured to perform one or more functionalities of the object modeling and managing unit 104, or at least some of them, allowing also the terminal to carry out functions of the object modeling and managing unit 104. There may be one or several networks between the terminal and the server. They may comprise several terminals and servers with databases, which are preferably integrated to be visible to the user as one database and one database server. Whether the functions to be described below are performed in a single computing apparatus, in the terminal, in the server or so that some of them are performed in the terminal and some in the server, i.e. the location where functions of the object modeling and managing unit 104 are performed, is irrelevant to the invention.

Figure 2A:
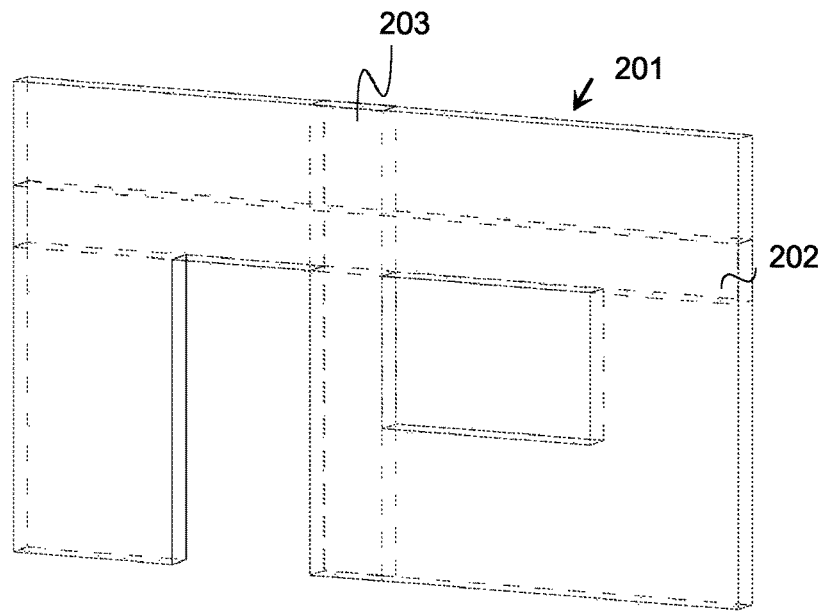
FIGS. 2A, 2B, 3 and 4 illustrate different examples.
Figure 2B:
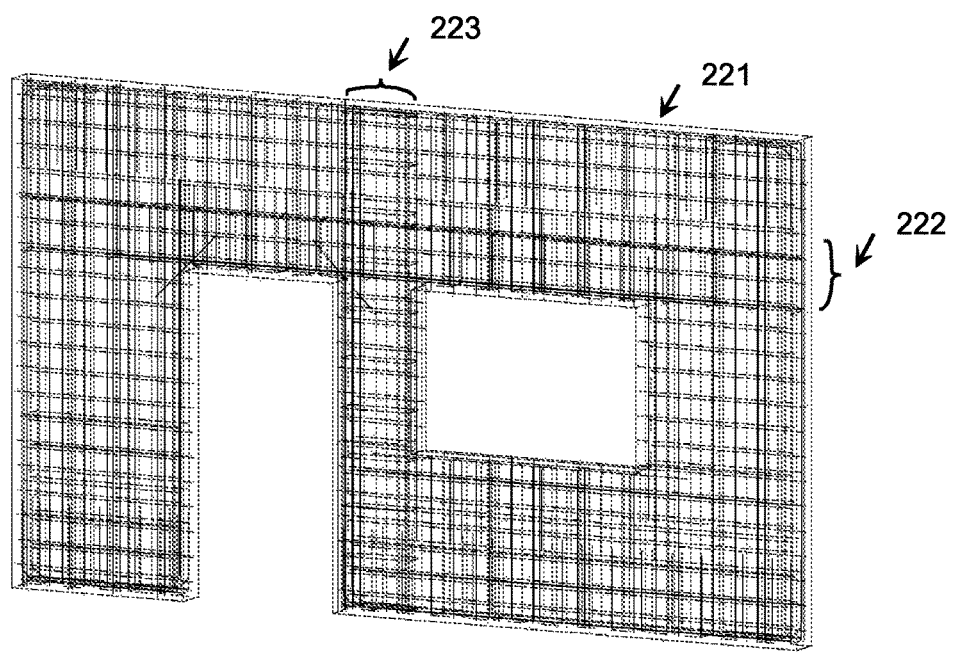

FIG. 2A illustrates virtual objects and FIG. 2B illustrates physical objects created by means of the virtual objects. Together they form a part of a model of the wall whose definitions are illustrated in FIG. 1. The creation of the model will be described with reference to FIG. 5. For the sake of clarity, the object defining the wall and the objects defining details, i.e. a door and an opening, are treated below as one entity called a wall object. It is used as an example of a physical object that represents a real world article that exists or will exist.

FIG. 2A illustrates virtual models that a wall to be constructed comprises, the virtual models being a first virtual object 201, a second virtual object 202 and a third virtual object 203. The first virtual object has a geometry corresponding to the geometry of the wall to be constructed, and it is associated, by its definitions, with the wall object so that a change made to the wall object's definitions or a change to its detail objects, such as an opening, or to a connection object added to/removed from the wall will be propagated to the first virtual object 201. Thus the geometries of the first virtual object and the wall to be constructed remain corresponding to each other. The second and the third virtual objects 202, 203 both have a geometry of a regular hexahedron with a rectangle cross section. The second virtual object is associated with physical properties of the wall object, i.e. a width and a length, and with a logical property of the wall object, i.e. an upper edge of the door opening. Further, the second virtual object 202 has two physical properties that are not associated with other objects, namely a cross section (rectangle) and a height. Also the third virtual object 203 is associated with physical properties of the wall object, i.e. a width and a height, and with logical properties of the wall object, i.e. the length of the third virtual object 203 is determined by the left edge of a door opening and the right edge of a window opening. Further, the second virtual object 202 has a physical property that is not associated with other objects, namely the cross section.

Thus, a virtual object may have one or more physical properties and/or one or more virtual properties. Further, the virtual object may be associated with a physical property and/or a logical property of a physical object. Logical properties are described in more detail in U.S. Pat. No. 7,765,240 which is incorporated herein by reference.

Although in the example each virtual object is associated with one or more physical objects that need not be the case. A virtual object may be associated with one or more virtual objects, and a virtual object may be associated only with virtual objects. Further, a model may be created by creating first one or more virtual objects which are then used for creating physical objects. Hence a physical object may include one or more virtual objects, and the way the virtual object(s) depend on the physical object may be different for each or some of the virtual objects than for the other virtual objects. Further, a virtual object may depend on one or more different physical objects. If the virtual object depends on two or more different physical objects, it may depend on them in different and/or in similar ways, and the virtual object may be used for creating one or more further physical objects. The following examples use the example of FIG. 1 as a basis. In an example model, the "wall 1 length" and "wall 1 width" in the definitions of the virtual object "virtual 2", may be replaced by "virtual 1 length" and "virtual 1 width". In another example model, no objects "wall 1, door 1, window 1" are created but the virtual object "virtual 1" is defined with a corresponding shape and associated to a corresponding location in the model, and the objects "rebars 1", "virtual 2" and "virtual 3" are defined by means of the virtual object "virtual 1". It should be appreciated that the virtual object "virtual 1" may be created as a combination of two or more virtual objects, i.e. some of the virtual objects may be cutting types of objects with which holes etc. may be created to another virtual object.

The reinforcement (also called rebars) representing steel bars are illustrated in FIG. 2B, the reinforcement comprising, in addition to a basic wall reinforcement mesh 221, column type reinforcement 223 and a beam type reinforcement 222. The basic wall reinforcement mesh is created by means of the virtual object 201 in FIG. 2A (the virtual object 1 in FIG. 1) and changes, when the virtual object 201 changes. The column type reinforcement is created by means of the virtual object 203 in FIG. 2A (the virtual object 2 in FIG. 1) and it changes when the virtual object 203 changes. The beam type reinforcement is created by means of the virtual object 202 in FIG. 2A (the virtual object 3 in FIG. 1) and it changes when the virtual object 202 changes. It should be appreciated that in another embodiment the first virtual object 201 is not used for the basic wall reinforcement mesh 221 in which case the basic wall reinforcement mesh 221 is associated directly with the wall object, and changes accordingly. It should be appreciated that in general the reinforcement is not classified as a beam type reinforcement or column type reinforcement but the user selects amongst different reinforcement options the one(s) the user wants to add to the virtual object. Alternatively, the selection may be controlled or guided by strength analysis results.

Thus, it bears no significance how the reinforcement is selected, it suffices that the virtual objects are utilized in the creation of the reinforcement.

Figure 3:
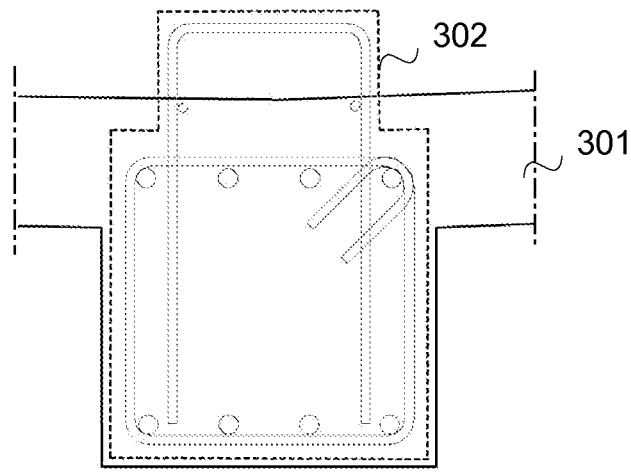

Although in the above a virtual object is located within the physical object(s) with which it is associated, that need not be the case. FIG. 3 illustrates an example in which a virtual object 302 extends outside the boundaries of a physical object 301 representing a cast-in-structure with a beam and a slab. For example, bond reinforcement may be modeled by means of a virtual object 302 having a cross section of a ledger beam. The virtual object 302 may be associated with the properties of the beam and/or the slab and/or an upper structure (not illustrated in FIG. 3) for which the beam bond reinforcement is intended. For example, the ledger dimensions may depend on the height and width of the beam and width of the upper structure. The reinforcement is then associated with the logical and/or physical properties of the virtual object 302.

Figure 4:
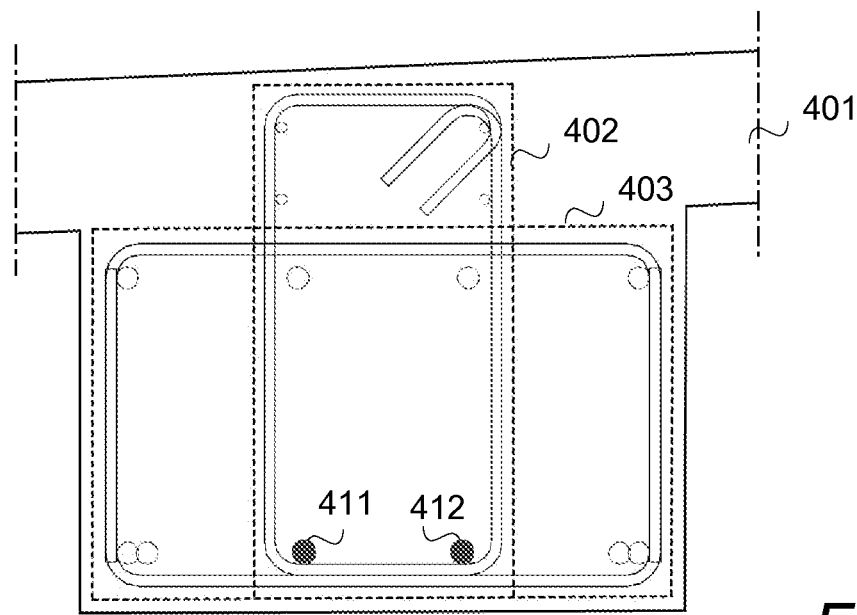

Further, unlike physical objects of the same type, virtual objects may overlap with each other and the virtual objects allow a physical object to exist in two or more different virtual objects. FIG. 4 illustrates an example in which there are two overlapping virtual objects 402 and 403 in a piece of a physical object 401 representing a cast-in-structure with a beam and a slab. Reinforcement bars 411 and 412 belong to both virtual objects 402 and 403 as part of the reinforcement created by means of the virtual objects. A corresponding situation is not possible with physical objects, since physical objects representing corresponding physical articles, such as reinforcement bars, cannot overlap and therefore a reinforcement bar can belong only to one physical object representing a reinforcement bar. Naturally, a first physical object representing a first reinforcement bar may overlap with other physical objects representing other physical articles, such as a second physical object representing a second reinforcement bar or a second physical object representing a beam or column. The object modeling and managing unit is preferably configured to detect that a physical object created by means of a virtual object overlaps or is adjacent enough to a physical object created by means of another virtual object, and combines them, if possible, to one physical object. For example, if horizontal rebars created by means of the virtual object 402 have a diameter of 8 mm, horizontal rebars created by means of the virtual object 403 have a diameter of 16 mm and it is detected that the lowest horizontal rebars created by means of the virtual object 402 are adjacent enough to the two middle lowest horizontal rebars created by means of the virtual object 403, the rebars are combined to the rebars 411 and 412 having a diameter of 16 mm and being associated with both virtual objects 402 and 403.

Different rules for determining whether or not the physical objects are adjacent enough and/or whether or not it is possible to combine them may be defined and used; the concept of the virtual objects does not limit them. However, depending on what is modeled, there may be rules or regulations that should be taken into account. For example, there are rules defining a minimum distance between two adjacent rebars, and if the distance between the rebars is less than the minimum distance, they are to be interpreted to be adjacent enough. In that case, if combining them into one rebar is not possible because of load, for example, they have to be modeled to be side by side.

Figure 5:
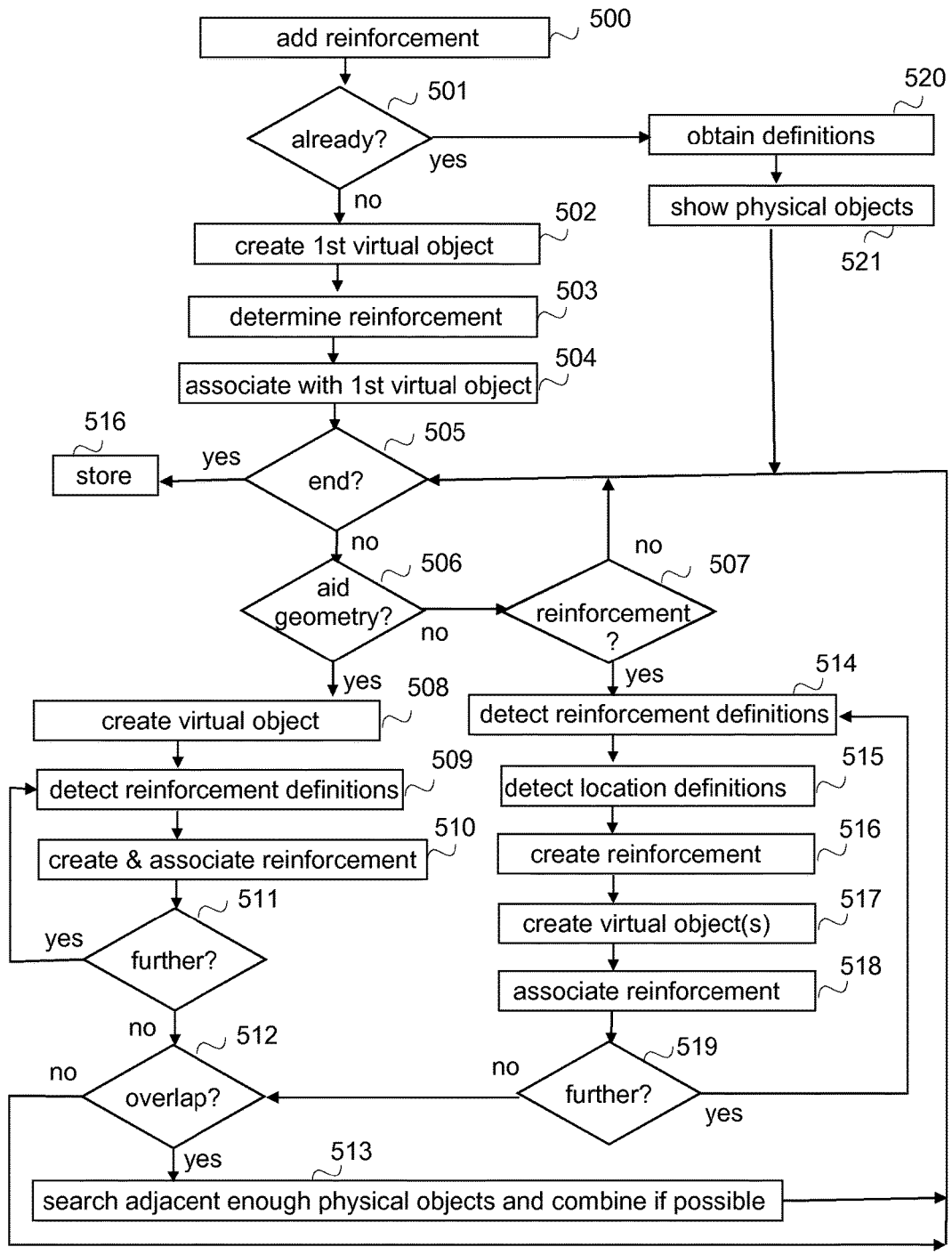
FIGS. 5, 6 and 7 are flow charts illustrating modeling.

FIG. 5 shows a flow diagram illustrating how the user models a reinforcement. The flow diagram only shows a very broad outline and not a detailed step-by-step modeling. In the illustrated embodiment, all reinforcements are associated to virtual objects, and thus one can say that they are modeled by means of virtual objects even though the reinforcement is modeled first.

In the example of FIG. 5, it is assumed that a building frame model has been created earlier, it has been obtained, the user has selected a piece in the model, like the wall described above, and selects adding of a reinforcement to the selected piece in step 500. Therefore it is checked, in step 501, whether or not a virtual object exists for the selected piece. If not, a first virtual object is created in step 502. The first virtual object corresponds to the geometry formed by one or more physical objects defining the piece the user has selected. Further, the first virtual object is associated with the physical object(s). In other words, the parameters defining the geometry, location in the model and association(s) of the virtual object are concluded in response to the user's decision to add a reinforcement for the first time. If the above wall example is used, the user has selected the wall and then the adding of the reinforcement for the first time for the wall causes that the virtual object 201 illustrated in FIG. 2A is created in step 502 without any further user involvement. It should be appreciated that instead of one first virtual object, several first virtual objects may be created, if more suitable for the geometry, for example.

After the virtual object is created, the reinforcement is determined, in step 503, to the virtual object, and the reinforcement is associated, in step 504, at least with the first virtual object. The reinforcement may be determined automatically by the modeling application or manually by the user via the user interface.

It is then checked, in step 505, if the user ends adding the reinforcement. If not, it is monitored, in step 506, whether the user starts to add an aid geometry (step 506) or further reinforcement (step 507), or ends adding the reinforcement (step 505).

If the user starts to add the aid geometry (step 506), it is a virtual object, and a corresponding virtual object with one or more associations, a location, and geometry definitions is created in step 508. Next, reinforcement definitions are detected in step 509. In other words, it is detected that the user has selected or created a certain kind of reinforcement having specific reinforcement definitions. Hence, a corresponding reinforcement is created in step 510 to the volume defined by the virtual object created in step 508 and associated in step 510 with the virtual object. It is then checked, in step 511, whether or not the user selects or creates a further reinforcement, i.e. continues by adding a further reinforcement to the volume defined by the virtual object created in step 508. If yes, the process proceeds to step 509.

If the user does not continue by adding a further reinforcement (step 511), it is checked in step 512, whether the virtual object overlaps with one or more virtual objects. If yes, then in step 513 all physical objects created by means of the overlapping virtual objects that are adjacent enough are searched for and combined, if possible, as is described above with reference to FIG. 4.

When the searching and combining is performed (step 513), or if the virtual object does not overlap with one or more virtual objects (step 512), the process continues to step 505 to check if the user ends adding reinforcements.

If the user starts to add a reinforcement (step 507) by selecting a reinforcement or otherwise creating it, reinforcement definitions are detected in step 514. Then location definitions, provided by the user via the user interface, for the reinforcement are detected in step 515. When the location has been defined, the reinforcement is created in step 516 and one or more virtual objects are created in step 517 automatically so that the reinforcement created in step 515 is within the volume defined by the one or more virtual objects. In other words, while creating the reinforcement, the parameters defining the geometry, a location and association(s) of the virtual object(s) are concluded. After that the reinforcement is associated in step 518 with the corresponding virtual object/virtual objects.

It is then checked, in step 519, whether or not the user further selects or creates reinforcements, i.e. continues by adding further reinforcements. If yes, the process proceeds to step 514.

If the user does not continue by adding further reinforcements (step 519), the process proceeds to step 513 to check whether the virtual object or virtual objects created in step 517 overlap with one or more other virtual objects.

When the user ends (step 505) the adding of reinforcement, the reinforcement objects with corresponding virtual objects are stored, in step 516, to the model.

If this is not the first time the user adds reinforcements to the piece (step 501), the earlier created reinforcement objects with corresponding virtual objects are obtained, in step 520, from the memory storing the model, and in step 521 the modeled physical objects are shown to the user. The process then continues to step 505 to check if the user ends adding reinforcements.

Depending on an implementation, the outlines of the virtual objects are either shown to the user or hidden from the user, or the user may select whether or not the outlines are shown.

Figure 6:
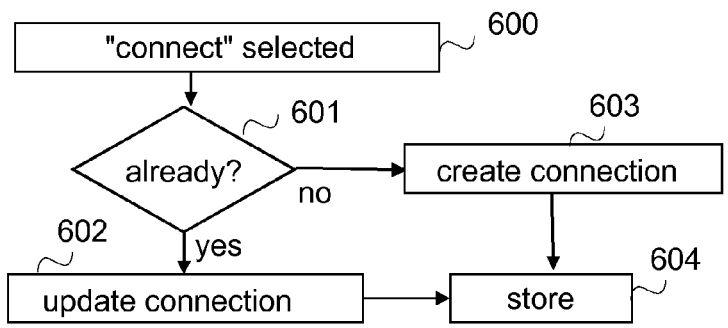

FIG. 6 shows a flow diagram illustrating one example of how the user may modify a modeled reinforcement. The flow diagram only shows a very broad outline.

Referring to FIG. 6, it is detected in step 600 that the user has selected "connect"-functionality for a certain part in the model. For example, the user may have selected in the model illustrated in FIG. 2B the part where reinforcements 222 and 223 overlap. A connection may be created between objects (virtual or physical) that overlap or are adjacent enough to each other so that a connection can be created between them.

In response to the selection, it is checked, in step 601, whether a connection for the selected part already exists. Depending on an implementation, a reinforcement combined in step 513 in FIG. 5 may be interpreted either as an existing connection or as no connection. If a connection already exists, the connection is updated by the modeling application, for example by the object modeling and managing unit, in step 602. If there is no connection (step 601), a connection is created in step 603 by the modeling application. The connection may be created or updated according to principles described in U.S. Pat. No. 7,617,076, for example. There are no restrictions on how the connection is created. The creation or updating of a connection may include adjusting reinforcements created by different virtual objects and modifying a geometry of a virtual object, if needed. For example, a rebar in a virtual object 1 may be combined with a rebar in a virtual object 2 so that after the connection is formed there is one rebar with a length corresponding to the length of the two rebars. Further, the creation or updating a connection may include adding a reinforcement and/or a virtual object(s), if needed. It should be appreciated that a connection is created or updated between each of the one or more virtual objects and/or physical objects created by means of the virtual objects that are within the user selection and between which a connection may be created. Hence, one connection may include one or more sub-connections.

When the connection/connections is/are ready, the amendments are stored in step 604.

In another embodiment, step 513 in FIG. 5 is replaced by steps 601 to 604 in FIG. 6, and step 512 is interpreted to correspond to step 600.

Figure 7:
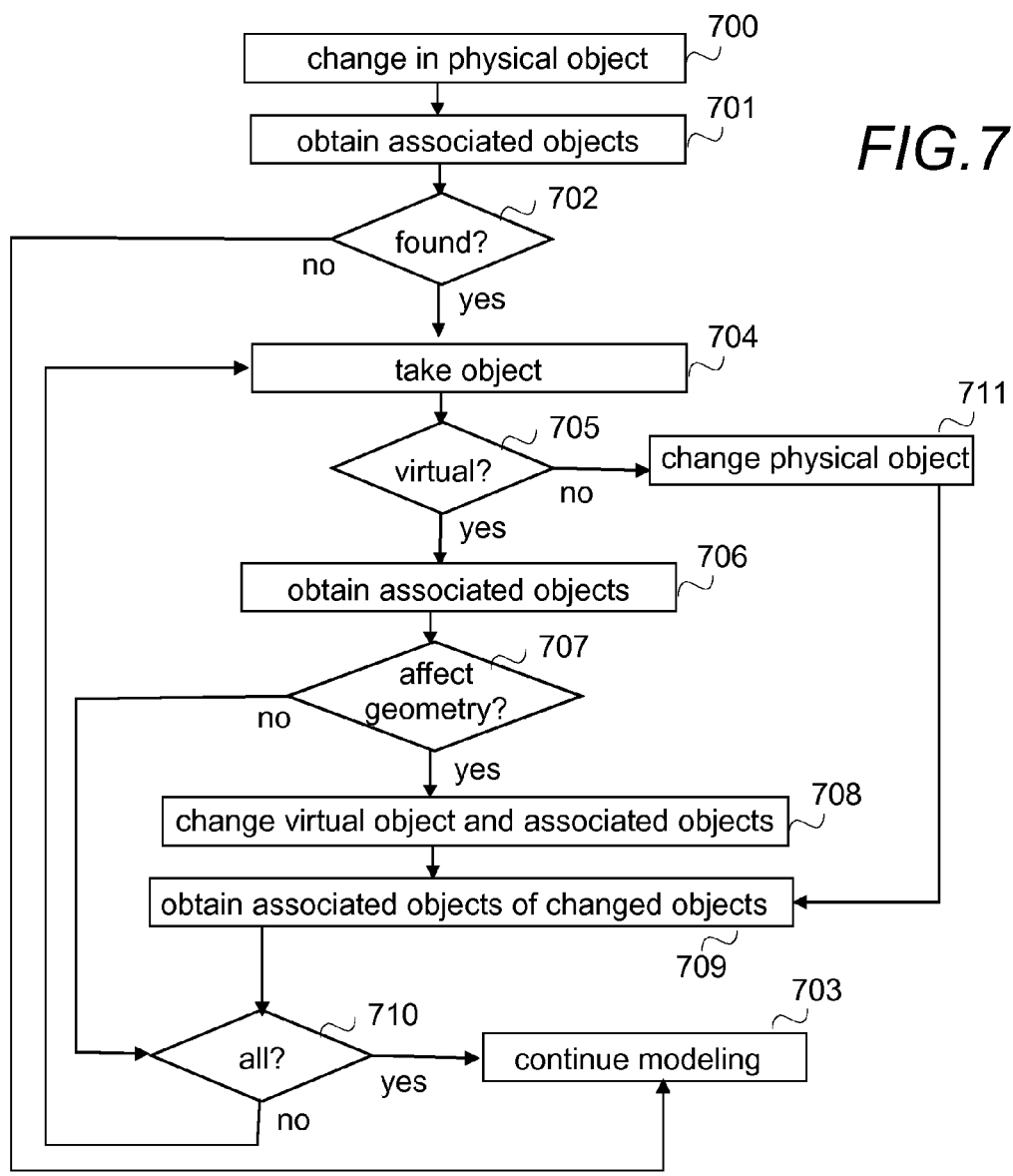

FIG. 7 illustrates how changes are propagated to objects created by means of virtual objects. In the illustrated example it is assumed that the user has changed a physical object. However, it should be appreciated that a similar procedure will be triggered when the user changes a virtual object, for example changes a dimension of the ledger beam in FIG. 3.

Referring to FIG. 7, a change in the definitions of a physical object is detected in step 700. Therefore in step 701 objects, physical and virtual ones, associated with the changed physical objects are obtained. If none is found (step 702), the modeling is continued in step 703. If at least one associated object is found (step 702), the associated object is taken for processing in step 704. It is then checked, in step 705, whether the object taken for processing is a virtual object. If it is a virtual object, further objects that are associated with the virtual object are obtained in step 706. In other words, the physical object that changed, i.e. was processed already (and which was used for obtaining the virtual object) is not obtained at this stage. It is then checked, in step 707, whether or not the change affects the geometry of the virtual object. For example, if a diameter of a rebar is changed from 10 mm to 8 mm, this typically does not change the geometry of the virtual object. However, if the user increases the length of the rebar (without making a connection) this typically changes the geometry of the virtual object. Another example of a parameter change that does not change the geometry of the virtual object is a change of material.

If the geometry of the virtual object is affected (step 707), the virtual object and associated objects are changed correspondingly in step 708. In other words, the geometry of the virtual object is changed, and those associated objects that are associated with the changed geometry definition(s) are changed correspondingly. Then in step 709 objects that are associated with the associated objects that were changed in step 708 are obtained.

It is then checked, in step 710, whether all obtained associated objects are processed. If not, the process continues to step 704 to take an object for processing. If all obtained associated objects are processed (step 710), the process continues to step 703, i.e. modeling continues.

If the geometry of the virtual object is not affected (step 707), the process proceeds to step 710 to check whether all obtained associated objects are processed.

If the object is not a virtual object (step 705), it is a physical object, which is changed, if needed, in step 711, to take into account the change made to the other object. (It should be appreciated that sometimes no change is required.) The process then proceeds to step 709 to obtain objects that are associated with the associated objects that were changed.

It should be appreciated that here also a change in the location is interpreted to affect the geometry by changing the actual geometry and/by changing the location of the object in question. For example, if the location of the wall illustrated with FIG. 2A is changed in the model, the locations of the associated virtual objects and the reinforcements change correspondingly. However, if the door opening and the upper end of the window opening in the example illustrated in FIG. 2A is moved upwards, the geometry of the virtual wall object changes, the virtual column object does not change, and the location of the virtual beam object changes, and these changes are propagated to associated physical objects, as described above.

In another implementation, it is checked after step 700 whether the detected change in the definitions affected the geometry of the physical object, and only if the geometry of the physical object was affected, the process continues in 701 to find out associated objects. In this implementation, if the geometry of the physical object is not affected by the change in the definitions, the modeling is continued (step 703).

The steps shown in FIGS. 5, 6 and 7 are not in an absolute chronological order and they can be performed deviating from the given order or simultaneously. For example, step 503 may be performed before step 502. Other functions may be performed between the steps described or simultaneously with them. For example, the user may be prompted to select, after step 500 or simultaneously with it, whether the user wants to use virtual objects or wants to model in a conventional way without virtual objects. Some or part of the steps shown in FIG. 5 can also be omitted, for instance steps 507 and 514 to 518 in an embodiment where the user needs to model the physical objects by means of further geometries, i.e. by means of virtual objects. In an embodiment, where no specific aid geometry—feature is provided to the user, steps 506 and 508 to 511 are omitted. In the embodiment the user does not need to know about virtual objects. Some or part of the steps described can also be replaced with a step accomplishing a corresponding end result. For example, if the modeling application provides an automatic basic reinforcement on the basis of the type of the object whereto the basic reinforcement is added, the dimensions and location of the virtual object may be used to determine whether the virtual object is a beam-like object, a column-like object, etc., and when the type is determined, a basic reinforcement based on the determined type is created without any user involvement.

Although in the above the concept of the virtual object was described with a reinforcement and a wall (prefabricated or cast-in-situ), i.e. describing a virtual object by means of which a model of a first structure that is to be included into a second structure may be created and associated with the second structure so that possible changes to the second structure are propagated to the first structure, the virtual object not representing itself an object that exists or will exist in the real world, the virtual object may be used for other purposes in computer implemented applications for modeling, too. Examples of such computer implemented applications include applications for building information modelling, applications for project cooperation, applications for construction management and/or detailing (steel detailing, precast concrete detailing, etc.) and/or for engineering, applications for strength calculations (for cast-in situ structures, for example), applications for infrastructure design and construction, applications for infrastructure and energy industries, such as applications for distribution network monitoring and operations support, applications for energy and water utilities' business operations, applications for municipalities' technical activities, without restricting the invention to such applications. It suffices that the computer implemented application allows using a virtual object to determine at least one parameter value of a physical object.

Although in the above all examples of virtual objects are polyhedrons (i.e. each is a geometric solid in three dimensions with flat faces and straight edges), it should be appreciated that a virtual object may have any geometric shape as long as it defines a three-dimensional volume. Other examples include a ball, a cube-like volume having a concave in one or more faces and/or one or more curved faces, or partly curved faces, a prolate spheroid ('egg-shaped'), and an opiate spheroid.

As a conclusion, a virtual object is an aid geometry (or geometric aid or assisting geometry or geometric assistant) that has a determined volume and properties defining a geometry and location of the virtual object, usable for modeling a physical object that is associated with the virtual object. The virtual object resembles a physical object but the virtual object does not represent a real world article, it is a specific type of assisting tool in computer aided modeling. Hence, it suffices to have only one virtual object type to assist modeling by means of physical object types. It should be appreciated that a model of an article, like a building, may be created by using mere physical object, but not by using mere virtual objects. Further, virtual objects are not taken into account in a quantity surveying, whereas physical objects are taken into account in the quantity surveying, for example.

It is obvious to a person skilled in the art that as technology advances, the basic idea of the invention can be implemented in a variety of ways. The invention and its embodiments are thus not limited to the above examples, but may vary within the scope of the claims.

The invention claimed is:

1. A computerized modeling method, comprising:
providing, by an object modeling and managing unit in a computing device, a modeling application with different physical object types, wherein each physical object type does not define a three-dimensional structure but includes a first set of parameters for defining a physical object that represents a three-dimensional structure, the first set of parameters including parameters for the physical object's type of object, dimensions of its three-dimensional structure, its location in a model, and its association to one or more virtual objects in a model, the different physical object types including a first set of physical object types for modeling concrete structures including beams, columns, and walls, and a second set of physical object types for modeling reinforcement bars to be included into one or more of the concrete structures;
providing, by the object modeling and managing unit, the modeling application with a virtual object type that is a generic modeling aid to assist with modeling more than one physical object, the virtual object type does not define a three-dimensional structure but includes a second set of parameters for defining a virtual object that represents a three-dimensional object, the second set of parameters including parameters for the virtual object's dimensions of its three-dimensional structure, its location in the model and its association to one or more physical objects in the model;
creating, by the object modeling and managing unit for storing in one or more data storages, a virtual object using the virtual object type by defining the parameters for its location in the model and the dimensions of its three-dimensional shape;
creating, by the object modeling and managing unit for storing in one or more data storages, more than one physical object to generate the model by using one of the first or second set of physical object types, and by linking to the parameters of the virtual object, each physical object being one of the first or second sets of physical object types and being a separate object from the virtual object, wherein one real-world article can be modeled only by one physical object;

generating, by the object modeling and managing unit for storing in the one or more data storages, the model comprising the more than one physical object created by linking to the virtual object without requiring its own set of definitions; and outputting, by the object modeling and managing unit, the model stored in the one or more data storages to a user interface for displaying to a user, the model comprising the more than one physical object linked to the virtual object.

2. A computerized modeling method as claimed in claim 1, further comprising:

associating the more than one physical object with the one or more virtual objects; and storing the one or more virtual objects and the more than one physical object with their definitions to the model.

3. A computerized modeling method according to claim 1, further comprising:

detecting that a first virtual object overlaps with a second virtual object;

searching for adjacent physical objects created by means of the overlapping two first and second virtual objects; and checking for each found adjacent physical object, whether or not combining of them is possible;

if possible, combining the adjacent physical objects to a combined physical object; and associating the combined physical object to both virtual objects.

4. A computerized modeling method according to claim 1, further comprising adding or updating a connection between a first physical object associated with a first virtual object and a second physical object associated with a second virtual object in response to a user input indicating a connection.

5. A computerized modeling method according to claim 1, wherein the geometry of the virtual object depends on at least one of the following two definitions comprising at least one definition of another virtual object and at least one definition of another physical object, and the virtual object is associated with each object on which the geometry of the virtual object depends.

6. A computerized modeling method according to claim 1, further comprising changing, in response to a change in the geometry of the virtual object, associated objects correspondingly.

7. A computerized modeling method according to claim 1, further comprising using the virtual object to create a model of a first physical object of the first set of physical object types that is to be included into a second physical object of the second set of physical object types.

8. A computerized modeling method according to claim 1, wherein the more than one physical object includes a reinforcement.

9. An apparatus comprising:

at least one processor including an object modeling and managing unit in a computing device; and at least one memory including computer program code, wherein the at least one memory and the computer program code are configured to, with the at least one processor including the object modeling and managing unit, cause the apparatus to:

provide a modeling application with different physical object types, wherein each physical object type does not define a three-dimensional structure but includes a first set of parameters for defining a physical object that represents a three-dimensional structure, the first set of parameters including parameters for the physical object's type of object, dimensions of its three-dimensional structure, its location in a model, and its association to one or more virtual objects in a model, the different physical object types including a first set of physical object types for modeling concrete structures including beams, columns, and walls, and a second set of physical object types for modeling reinforcement bars to be included into one or more of the concrete structures;

provide the modeling application with a virtual object type that is a generic modeling aid to assist with modeling more than one physical object, the virtual object type does not define a three-dimensional structure but includes a second set of parameters for defining a virtual object that represents a three-dimensional object, the second set of parameters including parameters for the virtual object's dimensions of its three-dimensional structure, its location in the model and its association to one or more physical objects in the model;

create, during the execution of the modeling application, a virtual object using the virtual object type by defining the parameters for its location in the model and the dimensions of its three-dimensional shape;

create more than one physical object to generate the model by using one of the first or second set of physical object types, and by linking to the parameters of the virtual object, each physical object being one of the first or second sets of physical object types and being a separate object from the virtual object, wherein one real-world article can be modeled only by one physical object;

generate the model comprising the more than one physical object created by linking to the virtual object without requiring its own set of definitions;

associate the more than one physical object with the virtual object;

store the virtual object and the more than one physical object with their definitions to a model; and output the model stored in the one or more data storages to a user interface for displaying to a user, the model comprising the more than one physical object linked to the virtual object.

10. An apparatus according to claim 9, wherein the at least one memory and the computer program code are further configured to, with the at least one processor, cause the apparatus to associate the virtual object with each object on which the geometry of the virtual object depends, the geometry of the virtual object depending on at least one of the following two definitions comprising at least one definition of another virtual object and at least one definition of another physical object.

11. A non-transitory computer readable storage medium having computer-readable instructions executable by a computer such that execution of said instructions by the computer will cause the computer to:

provide, by an object modeling and managing unit in a computing device, a modeling application with different physical object types, wherein each physical object type does not define a three-dimensional structure but includes a first set of parameters for defining a physical object that represents a three-dimensional structure, the first set of parameters including parameters for the physical object's type of object, dimensions of its three-dimensional structure, its location in a model, and its association to one or more virtual objects in a model, the different physical object types including a first set of physical object types for modeling concrete structures including beams, columns, and walls, and a second set of physical object types for modeling reinforcement bars to be included into one or more of the concrete structures;

provide, by the object modeling and managing unit, the modeling application with a virtual object type that is a generic modeling aid to assist with modeling more than one physical object, the virtual object type does not define a three-dimensional structure but includes a second set of parameters for defining a virtual object that represents a three-dimensional object, the second set of parameters including parameters for the virtual object's dimensions of its three-dimensional structure, its location in the model and its association to one or more physical objects in the model;

create, by the object modeling and managing unit for storing in one or more data storages, a virtual object using the virtual object type by defining the parameters for its location in the model and the dimensions of its three-dimensional shape;

create, by the object modeling and managing unit for storing in one or more data storages, more than one physical object to generate the model by using one of the first or second set of physical object types, and by linking to the parameters of the virtual object, each physical object being one of the first or second sets of physical object types and being a separate object from the virtual object, wherein one real-world article can be modeled only by one physical object;

generate, by the object modeling and managing unit for storing in the one or more data storages, the model comprising the more than one physical object created by linking to the virtual object without requiring its own set of definitions; and output, by the object modeling and managing unit, the model stored in the one or more data storages to a user interface for displaying to a user, the model comprising the more than one physical object linked to the virtual object.

12. A non-transitory computer readable storage medium according to claim 11 and having further computer-readable instructions which will further cause the computer to:
associate the more than one physical object with the one or more virtual objects; and
store the one or more virtual objects and the more than one physical object with their definitions to the model.

13. A non-transitory computer readable storage medium according to claim 11 and having further computer-readable instructions which will further cause the computer to:
detect that the virtual object overlaps with another virtual object;
search for adjacent physical objects created by means of the overlapping two virtual objects; and
check for each found adjacent physical object, whether or not combining of them is possible;
if possible, combine the adjacent physical objects to a combined physical object; and
associating the combined physical object to both virtual objects.

14. A non-transitory computer readable storage medium according to claim 11 and having further computer-readable instructions which will further cause the computer to add or update a connection between a first physical object associated with a first virtual object and a second physical object associated with a second virtual object in response to a user input indicating a connection.

15. A non-transitory computer readable storage medium according to claim 11 and having further computer-readable instructions which will further cause the computer to associate the virtual object with each object on which the geometry of the virtual object depends, the geometry of the virtual object depending on at least one of the following two definitions comprising at least one definition of another virtual object and at least one definition of another physical object.

16. A non-transitory computer readable storage medium according to claim 11 and having further computer-readable instructions which will further cause the computer to change, in response to a change in the geometry of the virtual object, associated objects correspondingly.

17. A non-transitory computer readable storage medium according to claim 11 and having further computer-readable instructions which will further cause the computer to use the virtual object to create a model of a first physical object of the first set of physical object types that is to be included into a second physical object of the second set of physical object types.

* * * * *